United States Patent
Mattisson

Patent No.: US 6,246,713 B1
Date of Patent: Jun. 12, 2001

(54) FREQUENCY-HOPPING IN A BANDWIDTH-ON-DEMAND SYSTEM

(75) Inventor: Sven Mattisson, Bjärred (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/092,860

(22) Filed: Jun. 8, 1998

(51) Int. Cl.[7] ................................................. H04K 1/00
(52) U.S. Cl. ........................ 375/132; 375/133; 370/343; 370/436; 455/452
(58) Field of Search ................................. 375/132, 133, 375/134, 135, 137, 136, 138; 370/330, 343, 436, 478; 455/450, 452, 447

(56) References Cited

U.S. PATENT DOCUMENTS

| 4,850,036 | 7/1989 | Smith . |
| 5,121,408 | 6/1992 | Cai et al. . |
| 5,210,771 | 5/1993 | Schaeffer et al. . |
| 5,263,047 | 11/1993 | Kotzin et al. . |
| 5,301,188 | 4/1994 | Kotzin et al. . |
| 5,381,443 | 1/1995 | Borth et al. . |
| 5,408,496 | 4/1995 | Ritz et al. . |
| 5,425,049 | 6/1995 | Dent . |
| 5,442,660 | 8/1995 | Kuo et al. . |
| 5,459,759 | 10/1995 | Schilling . |
| 5,483,550 | 1/1996 | Hulbert . |
| 5,502,722 | 3/1996 | Fulghum . |
| 5,528,622 | 6/1996 | Cadd et al. . |
| 5,537,434 | 7/1996 | Persson et al. . |
| 5,541,954 | 7/1996 | Emi . |
| 5,701,584 | * 12/1997 | Dupuy ................................. 455/33.1 |
| 5,859,841 | * 1/1999 | Gitlits ................................. 370/335 |
| 5,946,624 | * 8/1999 | Petranovich et al. ................ 455/447 |
| 5,999,818 | * 12/1999 | Gilbert et al. ....................... 455/448 |
| 6,009,332 | * 12/1999 | Haartsen ............................. 455/450 |
| 6,112,094 | * 8/2000 | Dent ................................... 455/452 |

FOREIGN PATENT DOCUMENTS

| 0786890A2 | 7/1997 | (EP) . |
| 0825741A2 | 2/1998 | (EP) . |

* cited by examiner

Primary Examiner—Stephen Chin
Assistant Examiner—Dac V. Ha
(74) Attorney, Agent, or Firm—Burns, Doane, Swecker & Mathis, L.L.P.

(57) ABSTRACT

A radio communication system that utilizes an available frequency spectrum that is divided up into a plurality of channels to be used by the radio communication system is operated in accordance with a frequency hopping strategy that permits a user to simultaneously utilize more than one channel during each hop period, wherein it is permissible, but not mandatory, for at least one of the channels utilized by the user during a first hop period to again be used by the user during an immediately following second hop period, so long as at least one of the channels utilized by the user during the second hop period is different from all of the channels utilized by the user during the first hop period. In some embodiments, the number of channels simultaneously utilized by any one user need not be the same as the number of channels simultaneously utilized by any other user.

20 Claims, 6 Drawing Sheets

FREQUENCY-HOPPING IN A BANDWIDTH-ON-DEMAND SYSTEM

BACKGROUND

The present invention relates to air interface design, and more particularly to the use of frequency hopping in a bandwidth-on-demand communications system In an orthogonal frequency-division multiple access (OFDM) system, the radio band is divided into many narrow orthogonal sub-bands, or channels. In such a system, bandwidth requirements can be tailored to suit each individual user ("bandwidth on demand") by assigning to each user as many channels as he or she requires.

In an unlicensed band, or in a situation in which channel allocation is uncoordinated, one or more channels may be jammed by other systems or uncoordinated users. One way to reduce the impact of such interference is to use frequency hopping (FH) techniques, where the carrier frequency is changed frequently so as to avoid being jammed continuously. Well-known coding, interleaving and/or retransmission techniques may then successfully be applied to reduce the interference problem.

The combination of OFDM with frequency hopping has the promise of providing bandwidth on demand and jamming resistance. When, however, much of the available bandwidth is allocated to one or only a few users, there are no unused frequencies to hop to. As a consequence, frequency hopping is ineffective under these circumstances. For example, if half of the channels are allocated to one user in a block of channels, there is only one other block to hop to. Similarly, if one fourth of the channels are allocated in a block, there are only three unused blocks of frequencies to choose from for the next hop.

There is therefore a need for techniques that will permit OFDM and other modulation schemes to offer bandwidth-on-demand in combination with effective frequency hopping techniques.

SUMMARY

In accordance with one aspect of the present invention, the foregoing and other objects are achieved in methods and apparatus for operating a radio communication system that utilizes an available frequency spectrum that is divided up into a plurality of channels to be used by the radio communication system. In one embodiment, a number, n, of the channels are allocated to be simultaneously used during a first hop period for communicating with a user of the radio communication system, wherein the allocated channels occupy adjacent frequency bands of the available frequency spectrum, and wherein the number n is greater than one. Then, n of the channels are allocated to be simultaneously used during a second hop period for communicating with the user of the radio communication system. The n channels allocated for use during the second hop period occupy adjacent frequency bands of the available frequency spectrum. Also, at least one of the n channels allocated for use during the second hop period is the same as at least one of the n channels allocated for use during the first hop period; and at least one of the n channels allocated for use during the second hop period is different from all of the channels allocated for use during the first hop period. In this way, non-orthogonal hops are permitted to occur.

In another aspect of the invention, the first and second hop periods may be consecutively occurring hop periods.

In still another aspect of the invention, n of the channels are allocated to be simultaneously used during a third hop period for communicating with the first user of the radio communication system. Here, the n channels allocated for use during the third hop period occupy adjacent frequency bands of the available frequency spectrum; and none of the n channels allocated for use during the third hop period is the same as any of the n channels allocated for use during the first and second hop periods. That is, orthogonal hops are also permitted to occur in the system, with one user sometimes performing non-orthogonal hops, and at other times performing orthogonal hops.

In yet another aspect of the invention, a second number, m, of the channels are allocated to be simultaneously used during the first hop period for communicating with a second user of the radio communication system, wherein the channels allocated for use by the second user occupy adjacent frequency bands of the available frequency spectrum. Then, m of the channels are allocated to be simultaneously used during the second hop period for communicating with the second user of the radio communication system. Here, the m channels allocated for use by the second user during the second hop period occupy adjacent frequency bands of the available frequency spectrum; and the number m is not equal to the number n. Because the number of channels allocated to the different users need not be the same, a frequency on demand system is provided.

In another aspect of the invention, at least one of the m channels allocated for use by the second user during the second hop period is the same as at least one of the m channels allocated for use by the second user during the first hop period; and at least one of the m channels allocated for use by the second user during the second hop period is different from all of the channels allocated for use by the second user during the first hop period. Thus, the second user is also permitted to perform non-orthogonal frequency hopping.

In an alternative embodiment, none of the m channels allocated for use by the second user during the second hop period is the same as any of the m channels allocated for use by the second user during the first hop period. That is, some users may perform an orthogonal hop, while other users perform a non-orthogonal hop.

In yet another aspect of the invention, a metric representative of the quality of a connection is obtained. The metric is then used to adjust the value of the number n (i.e., the number of adjacent channels assigned for concurrent use by the first user). In one embodiment, the metric is a bit error rate. In an alternative embodiment, the metric is a frame error rate. In yet another alternative embodiment, the metric is a carrier-to-interference ratio (C/I).

BRIEF DESCRIPTION OF THE DRAWINGS

The objects and advantages of the invention will be understood by reading the following detailed description in conjunction with the drawings in which.

DETAILED DESCRIPTION

Figure 1:
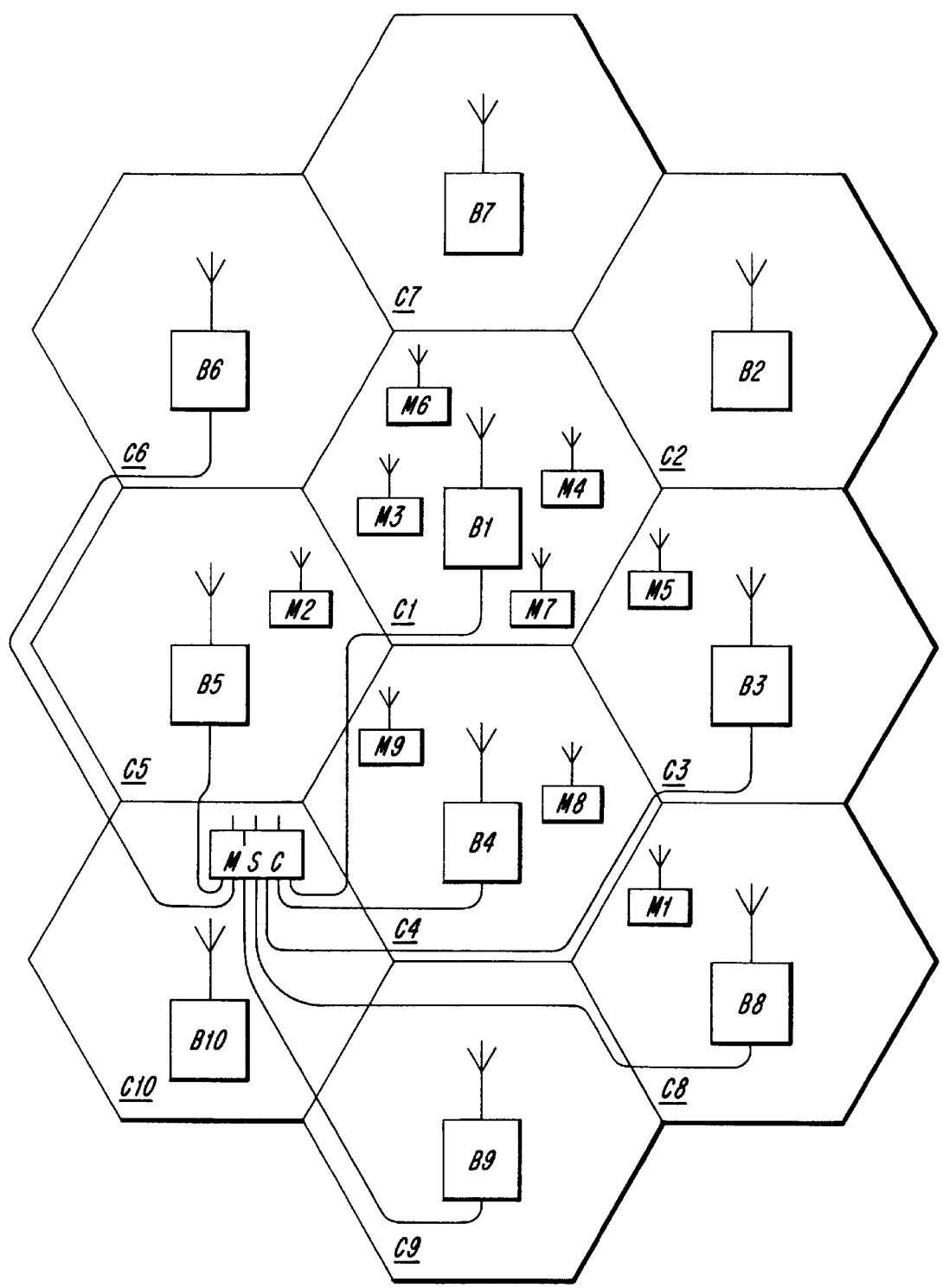
FIG. 1 illustrates an exemplary cellular system layout in which the inventive techniques are employed.

The various features of the invention will now be described with respect to the figures, in which like parts are identified with the same reference characters.

FIG. 1 illustrates ten cells C1 to C10 in an exemplary cellular mobile radio system. For each cell C1 to C10 there is a corresponding base station, denoted B1 to B10. Ten mobile stations, M1–M10, are also shown. They may be small hand held or vehicle mounted stations. The mobile stations are moveable within a cell and from one cell to another. A mobile switching center, abbreviated MSC, is connected to all the base stations by cables or any other fixed means, such as a radio or optical link. Some of these cables are omitted in FIG. 1 for simplicity. The MSC is also connected by cables or links to a fixed public telephone network or a similar fixed communication network (not shown).

During operation the mobile stations will be in contact with the fixed part of the system by transmission of radio signals to, and reception of radio signals from, the different base stations. Telephone calls, data communication links or other communication paths can be set up between one mobile station and another mobile station in the system. Calls can also be set up to mobiles in another system or subscribers in the fixed network. For the purposes of this discussion, all of these situations are called connections irrespective of whether they originate in a mobile station or end in a mobile station.

The exemplary system of FIG. 1 is, of course, a simplification as normally the system will comprise more cells and base stations. There can, for example, be umbrella cells each covering an area that is also covered by a group of micro cells. Also the number of mobile stations will normally be much larger. Base stations located in the vicinity of the cell borders and with sector antennas are also common. Some cells may be served by more than one base station. Several other MSCs with connected base stations will also normally exist and the mobile stations are usually also free to communicate via these other MSCs.

Mobile stations and base stations for use in a cellular radio system, such as the one illustrated in FIG. 1, are known, as is the employment of conventional frequency hopping techniques. U.S. Pat. No. 5,537,434, issued to Persson et al., and U.S. Pat. No. 5,425,049, issued to Dent, illustrate known hardware and techniques for utilizing frequency hopping in radio communications systems, and are hereby incorporated herein by reference.

In the systems exemplified by U.S. Pat. Nos. 5,537,434 and 5,425,049, each user is allocated one frequency band (channel) per hop. As a result, each user is afforded an equal amount of spectral bandwidth by which the communication is to take place. In accordance with one aspect of the invention, individual users are furnished with additional capacity by allocating a plurality of frequencies to each individual, wherein contemporaneous multiple frequency hopping sequences are employed for each of the allocated frequencies. The number of contemporaneous frequencies allotted to any one user may differ from the number allotted to other users, and in general may be a function of the bandwidth requirements of the individual. Thus, the provision of different numbers of frequencies to different individuals based on their needs provides a bandwidth on demand system.

When any one user is allotted more than one frequency band (channel) per hop, the problem arises of how to determine a hopping sequence for each of the allotted frequencies. This complexity can be reduced by arranging the hopping sequences so that corresponding contemporaneous hops of sequences occupy a corresponding number of adjacent frequency bands or channels.

Figure 2:
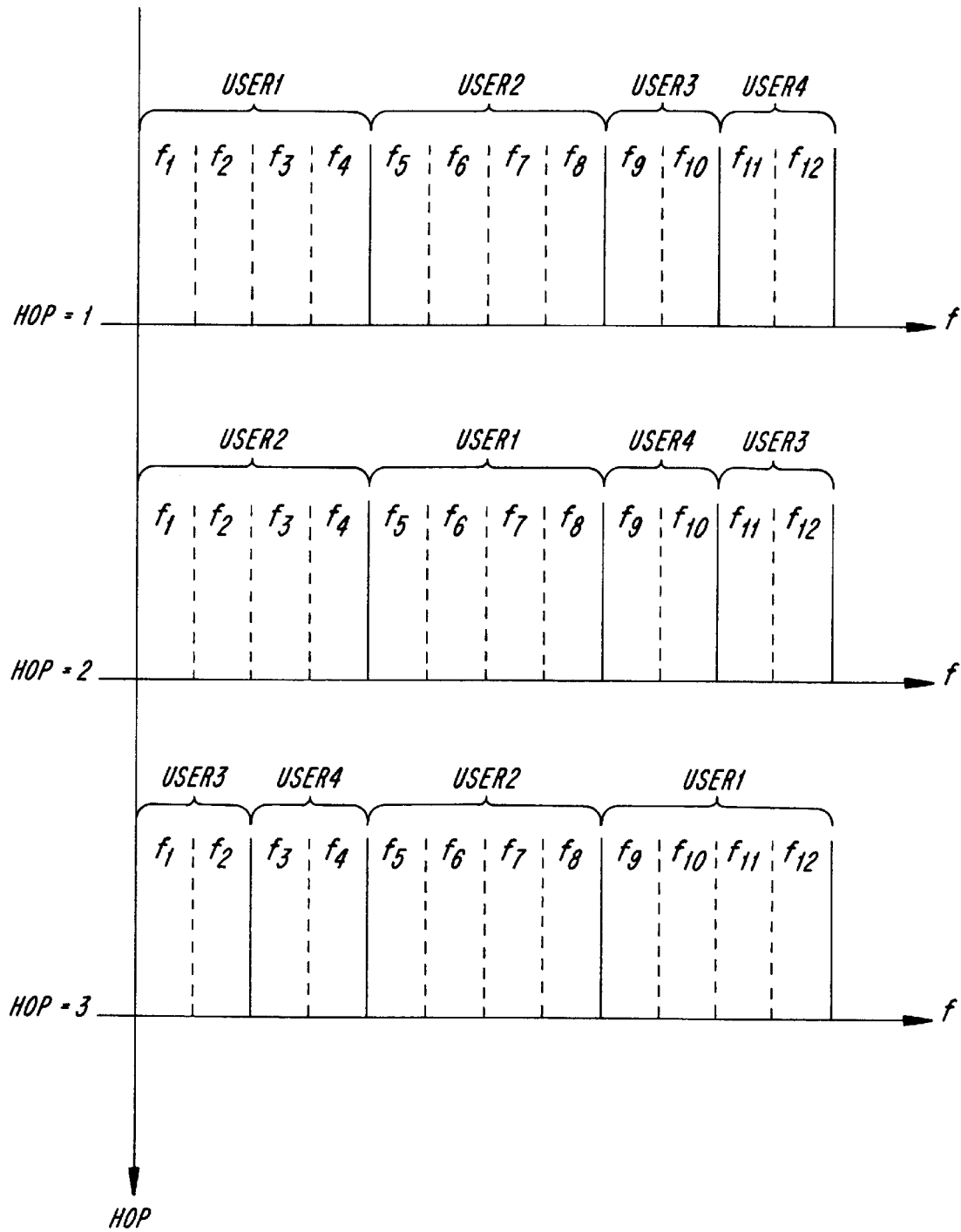
FIG. 2 illustrates a hopping sequence for four users in accordance with the prior art.

In conventional systems, orthogonal frequency hopping is performed, whereby hops are performed from one frequency band (or set of frequency bands) to a different frequency band (or non-overlapping set of frequency bands). Consequently, as stated in the BACKGROUND section, when much of the available bandwidth is allocated to one or only a few users, there may be few, if any, frequencies to hop to. This problem with prior art techniques is illustrated in FIG. 2. In this simple example, twelve frequency bands, designated $f_1$ through $f_{12}$, are provided. First and second users, respectively designated USER1 and USER2, are each allotted four frequency bands per hop. Third and fourth users, respectively designated USER3 and USER4, are each allotted two frequency bands per hop. It will be recognized that, in general, the number of frequency bands and the number of users will be far greater than the numbers used here, which are for illustration purposes only.

In a first hop (HOP=1), USER1 is allocated frequency bands $f_1$ through $f_4$, USER2 is allocated frequency bands $f_5$ through $f_8$, USER3 is allocated frequency bands $f_9$ through $f_{10}$, and USER4 is allocated frequency bands $f_{11}$ through $f_{12}$.

In conventional techniques, the orthogonality requirements limit the number of choices available for determining hop sequences. In this example, at a second hop (HOP=2), USER1 cannot be allocated any set of frequency bands that includes any of the frequency bands $f_1$ through $f_4$. Frequency bands $f_5$ through $f_8$ are an acceptable choice, and are therefore allocated to USER1. This allocation constrains the choices that can be made for USER2: either frequency bands $f_1$ through $f_4$ can be allocated, or alternatively frequency bands $f_9$ through $f_{12}$ can be allocated. In this example, USER2 is allocated frequency bands $f_1$ through $f_4$. This further constrains choices that can be made for USER3 and USER4, so that USER3 can only be allocated frequency bands $f_{11}$ through $f_{12}$, and USER4 can only be allocated frequency bands $f_9$ through $f_{10}$.

In a third hop (HOP=3), USER1 can only be allocated frequency bands $f_1$ through $f_4$ or, alternatively, frequency bands $f_9$ through $f_{12}$. If the former is selected, USER1 will be using the exact set of frequencies that were used only two hops earlier. Thus, it is decided to allocate frequency bands $f_9$ through $f_{12}$ to USER1. Since USER2 cannot continue using frequency bands $f_1$ through $f_4$, it is allocated frequency bands $f_5$ through $f_8$. It will be observed that USER2 is now using the same set of frequencies that were used only two hops earlier, so the problem that was avoided with USER1 has now been imposed on USER2. USER3 and USER4 are then allocated those frequency bands that were vacated by USER2. In this example, this means allocating frequency bands $f_1$ through $f_2$ to USER3, and allocating frequency bands $f_3$ through $f_4$ to USER 4.

In accordance with another aspect of the invention, the problems associated with conventional frequency hopping techniques are circumvented by eliminating the requirement of orthogonality in determining a hopping sequence to be utilized by a user in a cell. That is, a user who has been allotted a plural number of frequency bands per hop may utilize a hopping sequence in which, comparing one hop with any subsequent hop, some or even all of the allocated frequencies are the same. It is, of course, permissible for all of the allocated frequency bands at any given hop to be different from those that had been allocated at an earlier hop; it is, however, not a requirement. Overall, even though the channels may be grouped into "bins" (i.e., groups of contiguous frequency bands), hopping is not required to be performed on a bin-by-bin basis. Rather, hopping is still performed on a frequency band-by-frequency band basis, so that on any given hop, complete, partial or non-overlap of bins can exist with any of the bins occurring in a previous hop.

Figure 3:
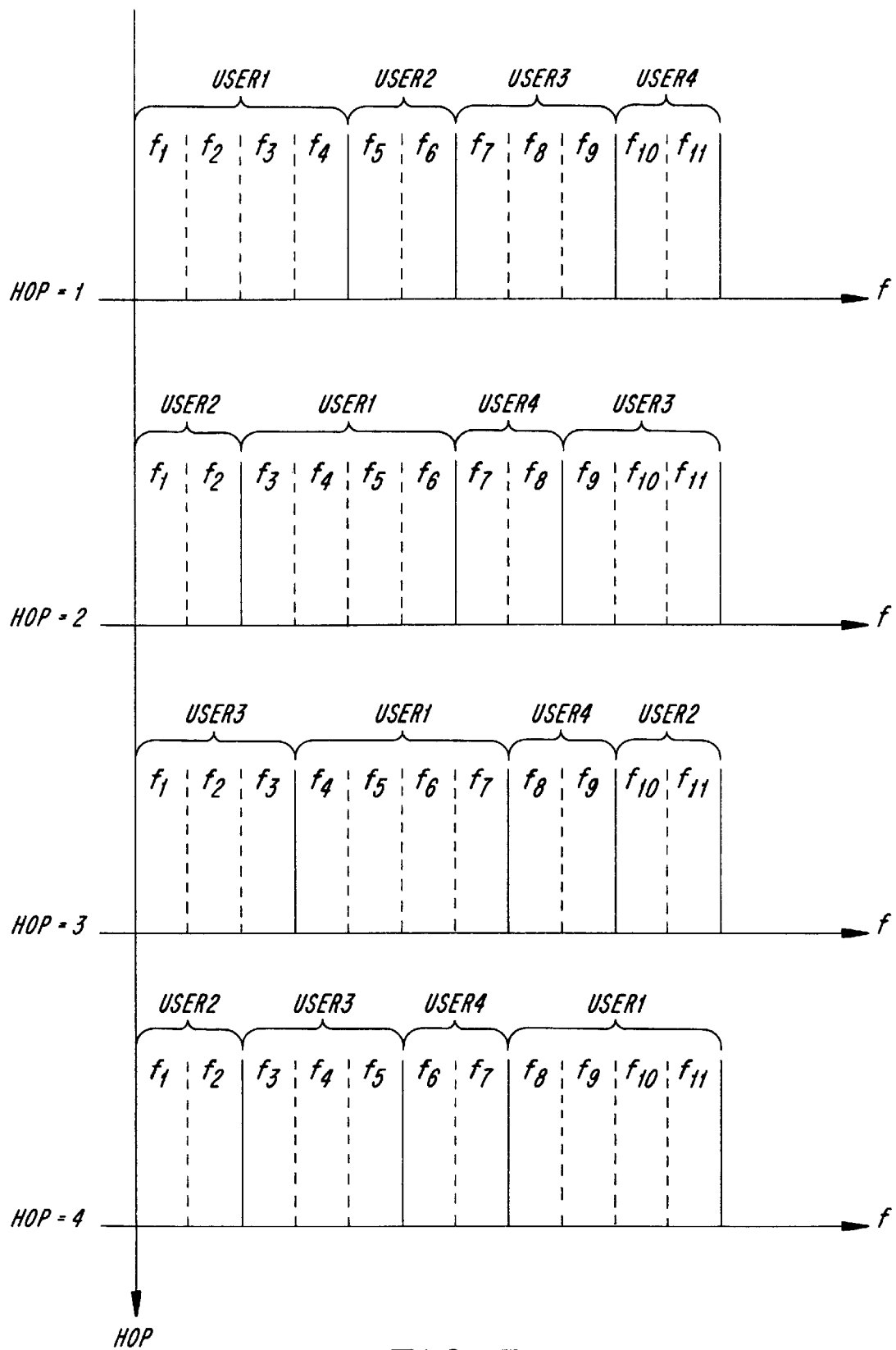
FIG. 3 illustrates an exemplary hopping sequence for four users in accordance with the present invention.

An exemplary hopping sequence in accordance with the invention is illustrated in FIG. 3. In this simple example, eleven frequency bands, designated $f_1$ through $f_{11}$, are provided. A first user, designated USER1, is allotted four frequency bands per hop. A second user, designated USER2, is allotted two frequency bands per hop. A third user, designated USER3, is allotted three frequency bands per hop, and a fourth user, designated USER4, is allotted two frequency bands per hop. It will be recognized that, in general, the number of frequency bands and the number of users will be far greater than the numbers used here, which are for illustration purposes only.

In a first hop (HOP=1), USER1 is allocated frequency bands $f_1$ through $f_4$, USER2 is allocated frequency bands $f_5$ through $f_6$, USER3 is allocated frequency bands $f_7$ through $f_9$, and USER4 is allocated frequency bands $f_{10}$ through $f_{11}$.

In a second hop (HOP=2) (which may or may not immediately follow the first hop), the inventive techniques permit USER1 to be allocated any set of frequency bands. Although it is preferable to allocate the frequency bands in a manner that results in at least one of the frequency bands not also having been used in the first hop, this is not a requirement. In this example, USER1 is assigned frequency bands $f_3$ through $f_6$. It will be observed that frequency bands $f_3$ and $f_4$ were also allocated to USER1 in the first hop, but this is acceptable because the inventive allocation technique does not impose restrictions on which frequency bands can be allocated to a user from one hop to the next, or between non-consecutive hops.

Also in the second hop, it is decided to assign frequency bands $f_9$ through $f_{11}$ to USER3. Again, there is overlapping usage of a frequency band between the first and second hops (i.e., $f_9$ has been allocated to USER3 in both the first and second hops), but this is acceptable.

To complete the assignment for the second hop, USER2 is allocated frequency bands $f_1$ through $f_2$, and USER4 is allocated frequency bands $f_7$ through $f_8$. For each of these users, there is complete orthogonality of frequency band assignments between the first and second hops.

In a third hop (HOP=3) (which may or may not immediately follow the second hop), USER1 is allocated frequency bands $f_4$ through $f_7$. Although frequency bands $f_4$ through $f_6$ were also allocated to USER1 for use in the second hop, the assignment is permissible because the because the inventive technique does not impose restrictions requiring orthogonality between any hops in a hopping sequence.

Also in the third hop, frequency bands $f_1$ through $f_3$ are allocated to USER3, frequency bands $f_8$ through $f_9$ are allocated to USER4, and frequency bands $f_{10}$ through $f_{11}$ are allocated to USER2. For USER4, there is some overlap, namely frequency band $f_8$, between the assignments made in the second and third hops. For USER3 and USER2, however, there is complete orthogonality.

In a fourth hop (HOP=4) (which may or may not immediately follow the third hop), it is decided to allocate frequency bands $f_6$ through $f_{11}$ to USER1, to allocate frequency bands $f_1$ through $f_2$ to USER2, to allocate frequency bands $f_3$ through $f_5$ to USER3, and to allocate frequency bands $f_6$ through $f_7$ to USER4. For USER1, USER2 and USER4, there is complete orthogonality between the frequency bands allocated in the third hop and the frequency bands allocated in the fourth hop. For USER 3, however, there is some overlap: $f_3$ is assigned in both cases. However the allocation of frequency bands $f_4$ and $f_5$ to USER3 in the fourth hop prevent USER3 from using the exact same frequency spectrum during consecutive hops.

It will be observed that by permitting non-orthogonal hops to occur, a wider variety of hopping sequences are made available. Thus, in the example of FIG. 3, each user is able to make the four illustrated hops without utilizing the exact same portion of the spectral bandwidth more than once. In other possible hop sequences, however, it is entirely possible that a user will utilize the exact same portion of the spectral bandwidth more than once.

By having channels as the frequency hopping resolution rather than blocks of channels (i.e., "bins"), a fixed set of frequency hopping sequences can be used regardless of the number of channels allocated. Consequently, all the benefits of frequency hopping can be retained even when many channels are allocated in one or a few blocks.

When several simultaneous users are active, no complex frequency hopping sequences are necessary. All users hop on a per channel basis. If most of the spectral capacity is allocated, the users will see a degradation in capacity. In this case, the system may be overloaded and user's allocated blocks may overlap, partially or completely, but they will still have some interference resistance. This situation is common to uncoordinated frequency hopping systems.

Complete coordination of frequency hopping sequences would result in a higher level of performance in a friendly environment. In a hostile environment, however, some users might be jammed constantly. In this case, frequency hopping on a per channel basis will randomize the jamming. The fact that some hops may cause (friendly) user blocks to overlap, and thus jam each other, is inevitable and relatively benign.

Figure 4:
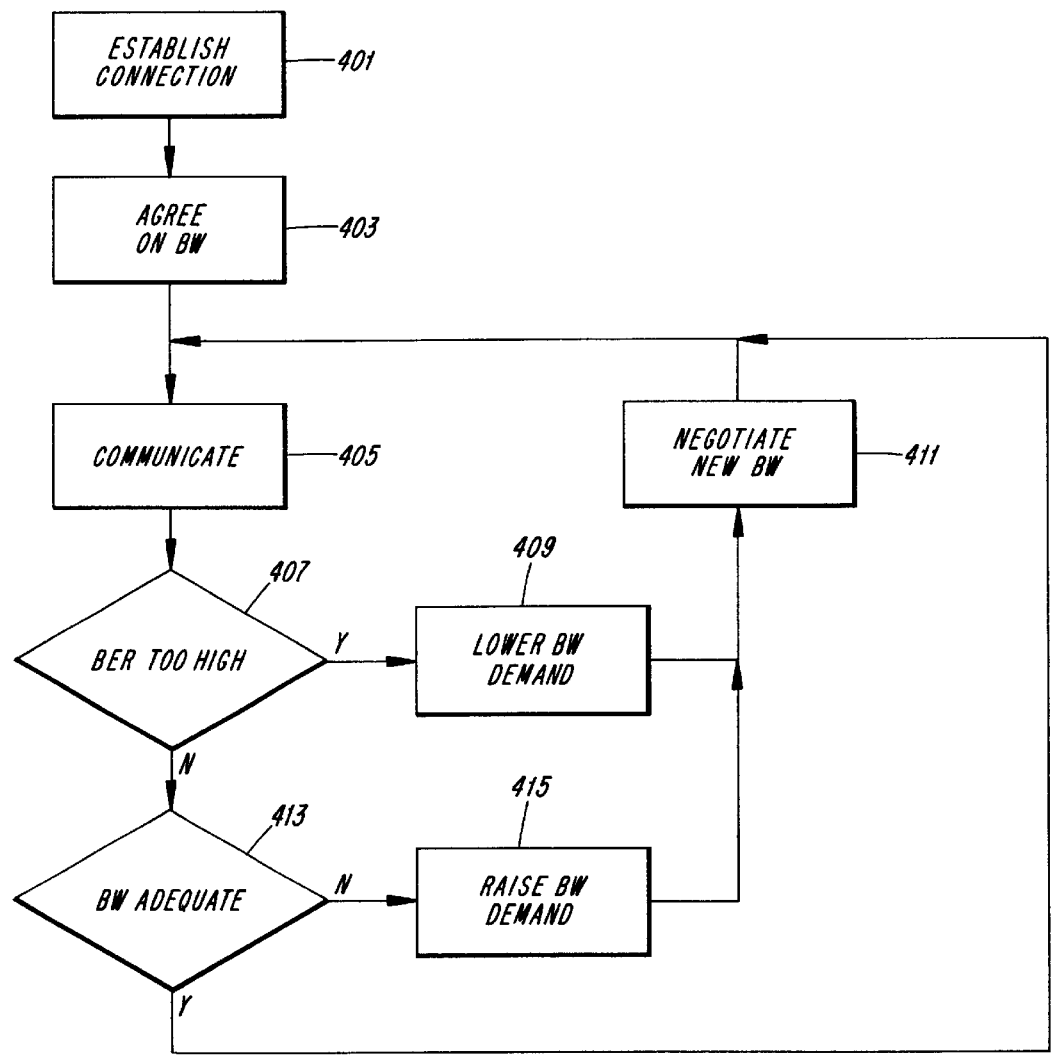
FIG. 4 is a flow chart depicting an exemplary connection management technique in accordance with one aspect of the invention.

In another aspect of the invention, the amount of jamming is kept to an acceptable level by obtaining a metric representative of the quality of a connection, and using that metric to control the amount of bandwidth that should be allocated to that connection. (The amount of bandwidth allocated to a connection is directly proportional to the likelihood of jamming.) This aspect will now be illustrated with reference to an exemplary connection management technique shown in the flow chart of FIG. 4. The example begins with the establishment of a connection between two units (step 401). The units may be a mobile terminal and a base station, a mobile terminal and another mobile terminal, or any two radio communication devices that are capable of employing the frequency hopping techniques described herein. Connection establishment is performed in accordance with conventional techniques, and is not described here in further detail.

Assuming that in this case a mobile terminal is communicating with a base station, after the connection has been established, the initiating unit tries to allocate a certain bandwidth (BW) for the connection. If it is a terminal that initiates the connection, it may not know anything about the existing traffic levels, and may try to get as much bandwidth as it thinks it needs. The base station may have a good idea of the existing traffic levels, and may, at this initial point, reduce the bandwidth to a level that it thinks is reasonable (step 403). However, in alternative embodiments, the units may start on a preset bandwidth and adjust it later on.

After the initial bandwidth has been negotiated, communication commences (step 405). Both units will be synchronized and will use the same pseudorandom number (PN) sequence to choose the set of contiguous OFDM carriers to use at any given time. The mapping of PN sequence values will have to make sure that either the bandwidth stays within the OFDM channel (when the variable bandwidth filter/detector receiver is used—see below), or that the starting frequency stays within the OFDM channel and that subsequent sub-carriers wrap around the OFDM channel (when the FFT receiver is used—see below). This will ensure that all sub-carriers within the OFDM channel are used in a random fashion.

At some interval the communication units obtain a metric that is representative of the quality of the connection. The link quality may be evaluated, for example, by looking at the bit error rate (BER) or frame error rate (FER). Other quality-related metrics, such as the carrier-to-interference ratio (C/I) could be used as well. If the error rate, or the interference level, is too high ("yes" path out of decision block 407), the demanded bandwidth is reduced (but not below one sub-carrier) (step 409) and this new bandwidth value is negotiated before communication continues (step 411).

If the error rate is low but the bandwidth used is below what is needed ("no" path out of decision block 413), then a higher bandwidth is demanded (step 415) and renegotiated (step 411).

With the dynamic bandwidth negotiation as described above, a local strategy between the terminal and base station, or between terminals in a peer-to-peer connection, can be used to optimize the bandwidth usage. A benefit of this approach is that during high traffic, fewer sub-carriers will be used by any communication link and more links will be active. When traffic is low, high-rate links may use more sub-carriers based without involving a centralized control.

This dynamic allocation scheme also works well for systems where co-channel interference may be a problem due to a limited band (i.e., where there are only a few OFDM channels to use for different base stations). The frequency hopping will randomize interference and the variable bandwidth will effectively create more sub-channels that will reduce co-channel interference.

Figure 5:
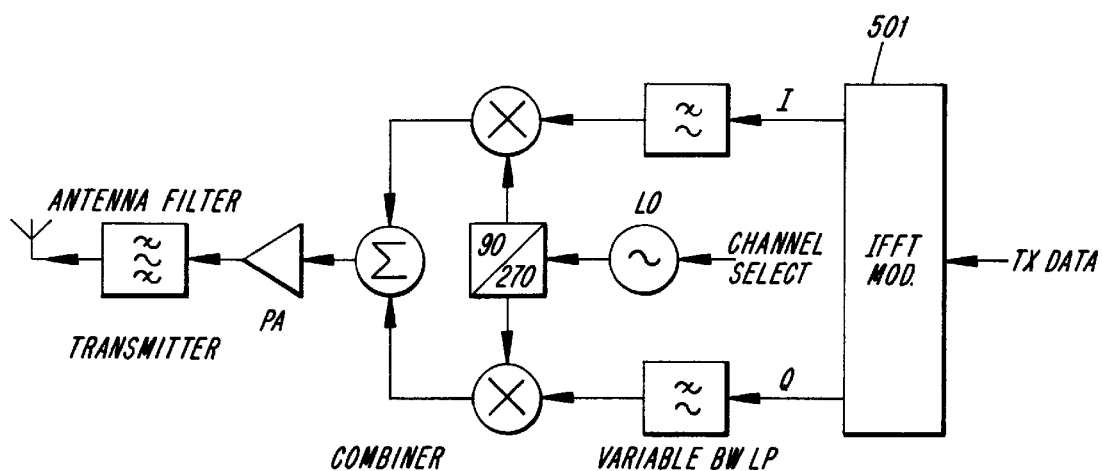
FIG. 5 is a block diagram of an exemplary OFDM transmitter for use with the invention.

An exemplary OFDM transmitter for use with the invention will now be described with reference to FIG. 5. Transmission (TX) data is supplied to an Inverse Fast Fourier Transform (IFFT) modulation block 501, where m by N bits are modulated on N sub-carriers with an m-ary modulation method. The modulation results in I and Q signals which are combined and up-converted in a standard way.

Figure 6:
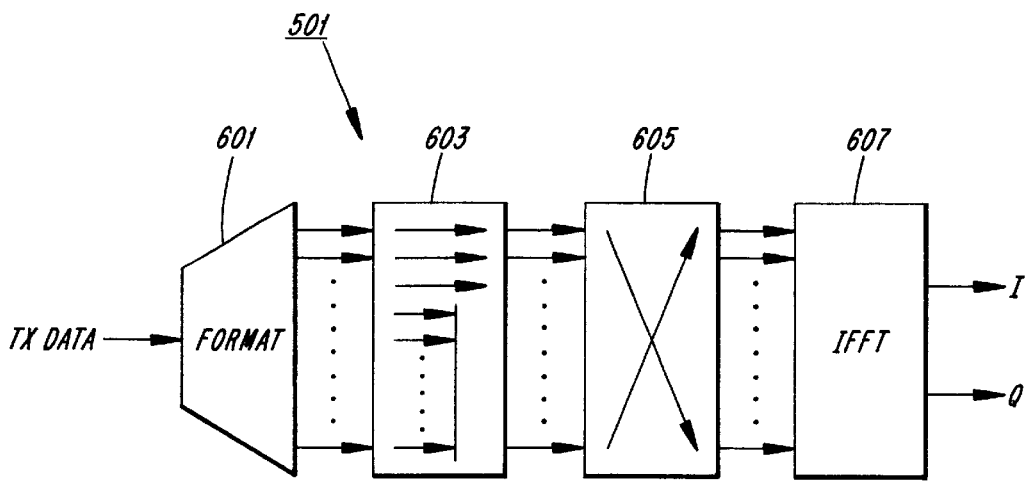
FIG. 6 is a block diagram of an exemplary implementation of an inverse fast Fourier transform modulator block for use in an exemplary OFDM transmitter.

A possible implementation of the IFFT modulation block 501 will now be described with reference to FIG. 6. TX data is supplied to a data formatter 601 that generates therefrom N parallel m-bit streams of data. The bandwidth is determined by a selector 603, which receives the N parallel m-bit streams of data from the data formatter 601, and outputs, at one time, a selected number of those m-bit streams. Each such selected m-bit stream is shifted in a barrel shifter 605 to accomplish frequency hopping and the corresponding N OFDM sub-carriers are modulated by means of a standard m-ary modulation scheme. Up to this point, data has been in the frequency domain. An inverse FFT block 607 performs this final conversion to time domain I and Q signals which can be used in a standard way. By varying the number of sub-carriers, N, the bandwidth of the signal can be modified. For example, twenty-four bits may be split on eight 3-bit streams. Each 3-bit stream will modulate a sub-carrier by 8-PSK in the frequency domain and the set of eight sub-carriers will then be combined and converted to time-domain I and Q signals by the inverse FFT block 607. It is possible to choose GMSK (N=1) or other schemes for the sub-carrier modulation.

Figure 7:
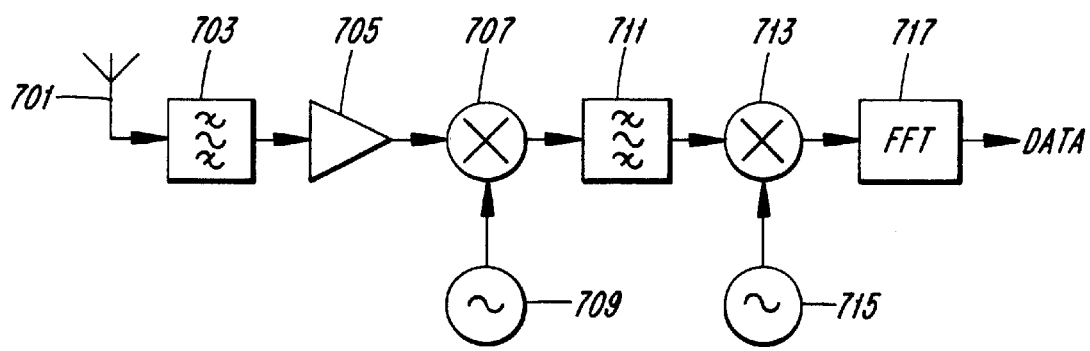
FIG. 7 is a block diagram of an exemplary OFDM receiver for use with the invention.

An exemplary receiver for the OFDM embodiment of the invention is the complement of the transmitter, as shown in FIG. 7. The signal received from an antenna 701 is passed through an antenna filter 703 and a low noise amplifier (LNA) 705. The output of the LNA 705 is mixed (in first mixer 707) with the signal from a first local oscillator 709. The mixed signal is passed through a bandpass filter 711. The resultant filtered signal is then mixed (in second mixer 713) with the signal from a second local oscillator 715. The output of the second mixer 713 is supplied to an FFT block 717, which converts the time domain signal into frequency domain sub-carrier information. By demodulating the sub-carriers and de-multiplexing them, the originally transmitted data stream is recovered. The choice of bandwidth and frequency hopping is, again, accomplished by the mapping of the sub-carriers to data streams.

OFDM is a special case of sub-banding. It is possible to use regular FDMA with any combination of modulation scheme (e.g., GMSK, QPSK, and the like). It is also possible to have a CDMA-based system in which the CDMA center frequency is hopped while the user bandwidth is varied according to the data rate. (This latter scheme may not be practical unless power control is employed.)

Figure 8:
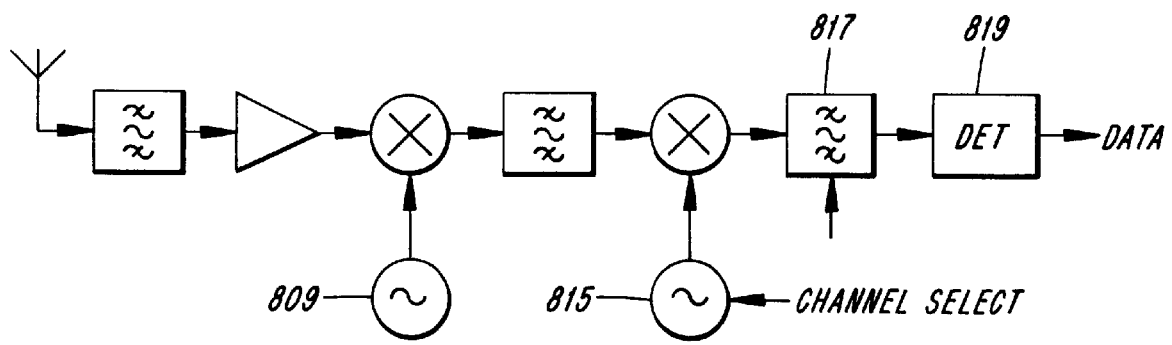
FIG. 8 is a block diagram of an exemplary non-OFDM receiver for use with the invention.

Thus, in alternative embodiments, the inventive frequency hopping techniques may be applied for use in non-OFDM systems. In such cases, the transmitter and receiver architectures may need to change. A block diagram of an exemplary non-OFDM receiver for use with the invention is depicted in FIG. 8. Here, frequency hopping controls the operation of the second local oscillator 815 (although, in alternative embodiments, the first local oscillator 809 could be used as well) and a variable bandwidth channel filter 817 sets the bandwidth. The detector 819 may now see, for example, a regular single-carrier signal and detect that. Sampling rate and other timing signals may be set as required by the actual methods and implementation employed. The transmitter may change symbol rate and center frequency to achieve variable bandwidth and frequency hopping.

The invention has been described with reference to a particular embodiment. However, it will be readily apparent to those skilled in the art that it is possible to embody the invention in specific forms other than those of the preferred embodiment described above. This may be done without departing from the spirit of the invention.

For example, the invention has been described in connection with an OFDM system. However, by having a frequency hop resolution that is finer than the channel bandwidth, or block of channels, the inventive frequency hopping techniques can be used even when the allocated user bandwidth is large compared to the frequency band in use.

The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A method of operating a radio communication system that utilizes an available frequency spectrum that is divided up into a plurality of channels to be used by the radio communication system, the method comprising the steps of:

allocating a number, n, of the channels to be simultaneously used during a first hop period for communicating with a user of the radio communication system, wherein the allocated channels occupy adjacent frequency bands of the available frequency spectrum, and wherein the number n is greater than one; and allocating n of the channels to be simultaneously used during a second hop period for communicating with the user of the radio communication system, wherein:

the n channels allocated for use during the second hop period occupy adjacent frequency bands of the available frequency spectrum;

at least one of the n channels allocated for use during the second hop period is the same as at least one of the n channels allocated for use during the first hop period; and at least one of the n channels allocated for use during the second hop period is different from all of the channels allocated for use during the first hop period.

2. The method of claim 1, wherein the first and second hop periods are consecutively occurring hop periods.

3. The method of claim 1, further comprising the steps of:

allocating a second number, m, of the channels to be simultaneously used during the first hop period for communicating with a second user of the radio communication system, wherein the channels allocated for use by the second user occupy adjacent frequency bands of the available frequency spectrum; and allocating m of the channels to be simultaneously used during the second hop period for communicating with the second user of the radio communication system, wherein:

the m channels allocated for use by the second user during the second hop period occupy adjacent frequency bands of the available frequency spectrum; and the number m is not equal to the number n.

4. The method of claim 3, wherein:

at least one of the m channels allocated for use by the second user during the second hop period is the same as at least one of the m channels allocated for use by the second user during the first hop period; and at least one of the m channels allocated for use by the second user during the second hop period is different from all of the channels allocated for use by the second user during the first hop period.

5. The method of claim 3, wherein:

none of the m channels allocated for use by the second user during the second hop period is the same as any of the m channels allocated for use by the second user during the first hop period.

6. The method of claim 1, further comprising the step of:

allocating n of the channels to be simultaneously used during a third hop period for communicating with the user of the radio communication system, wherein:

the third hop period immediately follows the second hop period;

the n channels allocated for use during the third hop period occupy adjacent frequency bands of the available frequency spectrum; and none of the n channels allocated for use during the third hop period is the same as any of the n channels allocated for use during the first and second hop periods.

7. The method of claim 1, further comprising the steps of:

obtaining a metric representative of the quality of a connection; and using the metric to adjust the value of the number n.

8. The method of claim 7, wherein the metric is a bit error rate.

9. The method of claim 7, wherein the metric is a frame error rate.

10. The method of claim 7, wherein the metric is a carrier-to-interference ratio.

11. An apparatus for use in a radio communication system that utilizes an available frequency spectrum that is divided up into a plurality of channels to be used by the radio communication system, the apparatus comprising:

means for allocating a number, n, of the channels to be simultaneously used during a first hop period for communicating with a user of the radio communication system, wherein the allocated channels occupy adjacent frequency bands of the available frequency spectrum, and wherein the number n is greater than one; and means for allocating n of the channels to be simultaneously used during a second hop period for communicating with the user of the radio communication system, wherein:

the n channels allocated for use during the second hop period occupy adjacent frequency bands of the available frequency spectrum;

at least one of the n channels allocated for use during the second hop period is the same as at least one of the n channels allocated for use during the first hop period; and at least one of the n channels allocated for use during the second hop period is different from all of the channels allocated for use during the first hop period.

12. The apparatus of claim 11, wherein the first and second hop periods are consecutively occurring hop periods.

13. The apparatus of claim 11, further comprising:

means for allocating a second number, m, of the channels to be simultaneously used during the first hop period for communicating with a second user of the radio communication system, wherein the channels allocated for use by the second user occupy adjacent frequency bands of the available frequency spectrum; and means for allocating m of the channels to be simultaneously used during the second hop period for communicating with the second user of the radio communication system, wherein:

the m channels allocated for use by the second user during the second hop period occupy adjacent frequency bands of the available frequency spectrum; and the number m is not equal to the number n.

14. The apparatus of claim 13, wherein:

at least one of the m channels allocated for use by the second user during the second hop period is the same as at least one of the m channels allocated for use by the second user during the first hop period; and at least one of the m channels allocated for use by the second user during the second hop period is different from all of the channels allocated for use by the second user during the first hop period.

15. The apparatus of claim 13, wherein:

none of the m channels allocated for use by the second user during the second hop period is the same as any of the m channels allocated for use by the second user during the first hop period.

16. The apparatus of claim 11, further comprising:

means for allocating n of the channels to be simultaneously used during a third hop period for communicating with the user of the radio communication system, wherein:

the third hop period immediately follows the second hop period;

the n channels allocated for use during the third hop period occupy adjacent frequency bands of the available frequency spectrum; and none of the n channels allocated for use during the third hop period is the same as any of the n channels allocated for use during the first and second hop periods.

17. The apparatus of claim 11, further comprising:

means for obtaining a metric representative of the quality of a connection; and means for using the metric to adjust the value of the number n.

18. The apparatus of claim 17, wherein the metric is a bit error rate.

19. The apparatus of claim 17, wherein the metric is a frame error rate.

20. The apparatus of claim 17, wherein the metric is a carrier-to-interference ratio.

* * * * *